(12) United States Patent
Everhart et al.

(10) Patent No.: US 9,094,417 B2
(45) Date of Patent: Jul. 28, 2015

(54) STATUS TRANSFER WITHIN A GROUP OF COMPUTING ENTITIES

(71) Applicants: Craig F. Everhart, Pittsburgh, PA (US); Steven M. Ewing, Pittsburgh, PA (US)

(72) Inventors: Craig F. Everhart, Pittsburgh, PA (US); Steven M. Ewing, Pittsburgh, PA (US)

(73) Assignee: NETAPP, INC., Sunnyvale, CA (US)

( * ) Notice: Subject to any disclaimer, the term of this patent is extended or adjusted under 35 U.S.C. 154(b) by 92 days.

(21) Appl. No.: 13/870,832

(22) Filed: Apr. 25, 2013

(65) Prior Publication Data

US 2014/0325599 A1 Oct. 30, 2014

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ................................. *H04L 63/104* (2013.01)

(58) Field of Classification Search
CPC .................................................. H04L 63/104
USPC ............................................................ 726/4
See application file for complete search history.

(56) References Cited

U.S. PATENT DOCUMENTS

| 7,664,233 | B1* | 2/2010 | Kirchmeier et al. ............ 379/37 |
| 7,948,966 | B2* | 5/2011 | Hughes et al. ................. 370/351 |
| 8,230,484 | B1* | 7/2012 | Wiese .................................. 726/3 |
| 2006/0117179 | A1* | 6/2006 | Karabulut ..................... 713/175 |
| 2007/0244817 | A1* | 10/2007 | Dolivo et al. ................... 705/50 |
| 2009/0183250 | A1* | 7/2009 | Harada ............................. 726/9 |
| 2013/0106982 | A1* | 5/2013 | Anantharaman et al. .. 348/14.03 |

* cited by examiner

*Primary Examiner* — Dant Shaifer Harriman
(74) *Attorney, Agent, or Firm* — Haynes and Boone, LLP

(57) ABSTRACT

A system and method for designating and administering authority in a trusted environment is provided. In some embodiments, a determination is made that a transfer of the authority to a second computing entity is warranted. The second computing entity is opportunistically contacted, and during the opportunistic contact, the authority is passed from the first computing entity to the second computing entity. The passing of the authority from the first computing entity to the second computing entity tasks the second computing entity with updating members of the group of the passing of the authority. The passing of authority may include providing an outstanding group update to the second computing entity and may also include tasking the second computing entity with completing the outstanding group update.

20 Claims, 11 Drawing Sheets

US 9,094,417 B2

STATUS TRANSFER WITHIN A GROUP OF COMPUTING ENTITIES

TECHNICAL FIELD

The present description relates to trusted electronic communications and more specifically to the management and verification of group roles, rosters, and credentials.

BACKGROUND

Even before the proliferation of distributed computing and the rise of the cloud, the ability to form groups of computing elements has been central to computing. These groups may share data and computing resources, and grouping is a common technique in the pursuit of the flexible reapportioning of resources. On demand provisioning holds the promise of greater resource availability and reduced idle time. However, current methods of group management require significant overhead, and seamless transparency has not yet been achieved.

Some of this overhead is devoted to securing communications between group members. Many practices for grouping resources devote time and cycles to exchanging information used to verify the identities of group members and to secure communications between the members. To direct this exchange, in some communications architectures, one or more group members are granted group management authority. This managing entity maintains a list of group membership and oversees the exchange of public cryptographic information including cryptographic keys and security certificates. Should the authority be transferred, the process of designating a new managing entity often triggers a furious exchange of data within the group. This hand-off becomes increasingly burdensome as group size increases. Compounding the problem, group members that lose contact with the group may miss the exchange and remain unaware of the transfer of authority. Thus, while conventional group management techniques have been generally adequate, limitations remain.

BRIEF SUMMARY OF THE INVENTION

The present disclosure relates to the management of groups of computing devices and to the transfer of authority from one device to another. Authority may include any permission, authorization, or responsibility associated with a device's role in the group. In various embodiments, a system and method for designating and administering authority in a trusted environment are provided. For example, in some embodiments, method for transferring status within a group of computing entities is provided. The method comprises: at a first computing entity having an authority, determining that a transfer of the authority to a second computing entity is warranted; opportunistically contacting the second computing entity; and during the opportunistic contact, passing the authority from the first computing entity to the second computing entity, wherein the passing of the authority from the first computing entity to the second computing entity tasks the second computing entity with updating members of the group of the passing of the authority.

In some embodiments, a computing entity is provided. The entity comprises a group management module including: a processor; and a memory storage element, wherein the memory storage element contains instructions readable by the processor, and wherein the instructions, when executed, are operable to: determine that a transfer of an authority role from the computing entity to a new managing entity is warranted; opportunistically provide notice to the new managing entity that the computing entity is retiring from the authority role; receive a confirmation from the new managing entity; and in response to the receiving of the confirmation, retire the computing entity from the authority role.

In some embodiments, an apparatus is provided. The apparatus comprises: a non-transitory, tangible computer readable storage medium storing a computer program, wherein the computer program has instructions that when executed by a computer processor, carry out: receiving, at a computing entity, a new claim of authority; receiving, at the computing entity, a chain of transfer of authority; receiving, at the computing entity, an updated group roster; verifying the new claim of authority based on the chain of transfers; and replacing an existing group roster maintained by the computing entity with the updated group roster in response to the verifying of the new claim of authority.

BRIEF DESCRIPTION OF THE DRAWINGS

The present disclosure is best understood from the following detailed description when read with the accompanying figures.

DETAILED DESCRIPTION

Figure 1A:
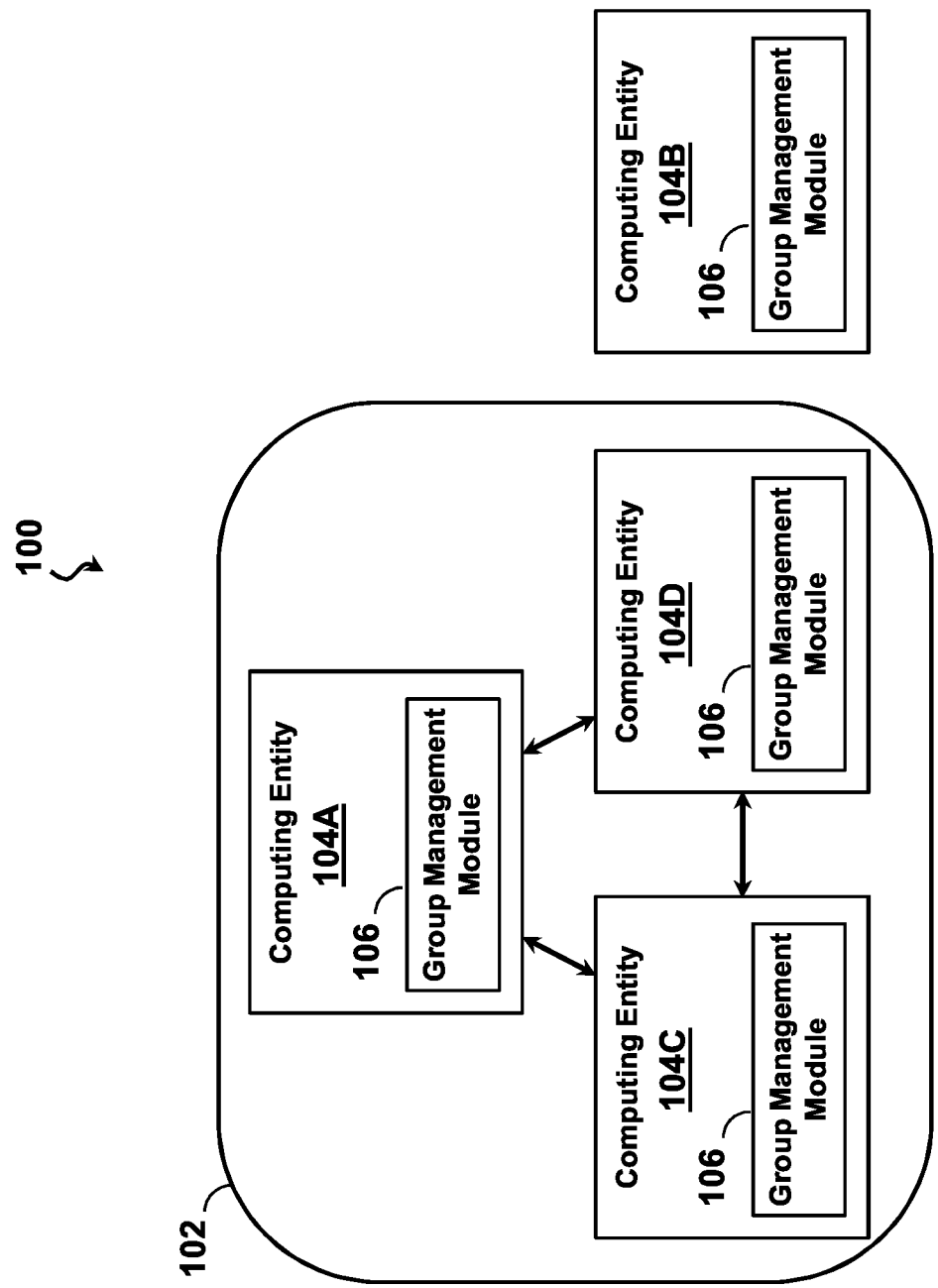
FIGS. 1A and 1B are system diagrams of a communications infrastructure containing a group of computing entities according to aspects of the present disclosure.

All examples and illustrative references are non-limiting and should not be used to limit the claims to specific implementations and embodiments described herein and their equivalents. The headings are solely for formatting and should not be used to limit the subject matter in any way, because text under one heading may cross reference or apply to text under one or more headings. Finally, in view of this disclosure, particular features described in relation to one aspect or embodiment may be applied to other disclosed aspects or embodiments of the disclosure, even though not specifically shown in the drawings or described in the text.

The present disclosure relates to the management of groups of computing devices and to the transfer of authority from one device to another. Authority may include any permission, authorization, or responsibility associated with a device's role in the group. As will be disclosed in detail below, in some embodiments, a group authority transfers the role unilaterally and at the retiring device's convenience. In some such embodiments, when an authority is ready to hand off the authority, it sets its own status to retiring and prepares a log of group tasks that are not yet complete. The handoff of authority may include handing off this log of unfinished tasks to be completed by the new authority.

During the hand-off, the retiring device may continue to receive requests for further group tasks until the other group members are notified of the hand-off. Instead of performing the tasks, the retiring device may cancel a request or may forward it to the new authority to perform. This allows the retiring device to retire before all of the outstanding tasks are complete. Particularly for Internet-based groups where a device may lose communication for extended periods, the time to complete the outstanding tasks may be substantial. Thus, in many embodiments, the systems and methods of the disclosure provide a faster and more efficient hand-off process.

In some embodiments, after the hand-off, the new authority notifies the group members of the change. As some group members may lose communication for extended periods, the new authority may catch up a returning member by supplying a chain of authorities to verify that the new authority received the group credentials from a legitimate source. In fact, the returning group member may have missed multiple hand-offs. However, the chain of authorities allows the returning member to track the flow of credentials from the last recognized authority to the current authority. Accordingly, the systems and method of the present disclosure provide an efficient authority transfer process with security and verification features.

It should be noted that the examples below refer to the passing of authority. One of skill in the art will recognize that passing "authority" includes passing any group role or administrative task such as group mastership, group maintenance, key management, gatekeeping, logging, auditing, and/or any other suitable group roles. Any of these roles and tasks may be passed independent of any other role or task. Accordingly, the scope of embodiments of the present disclosure may be adapted to pass any authority status from one element to another.

Figure 1B:
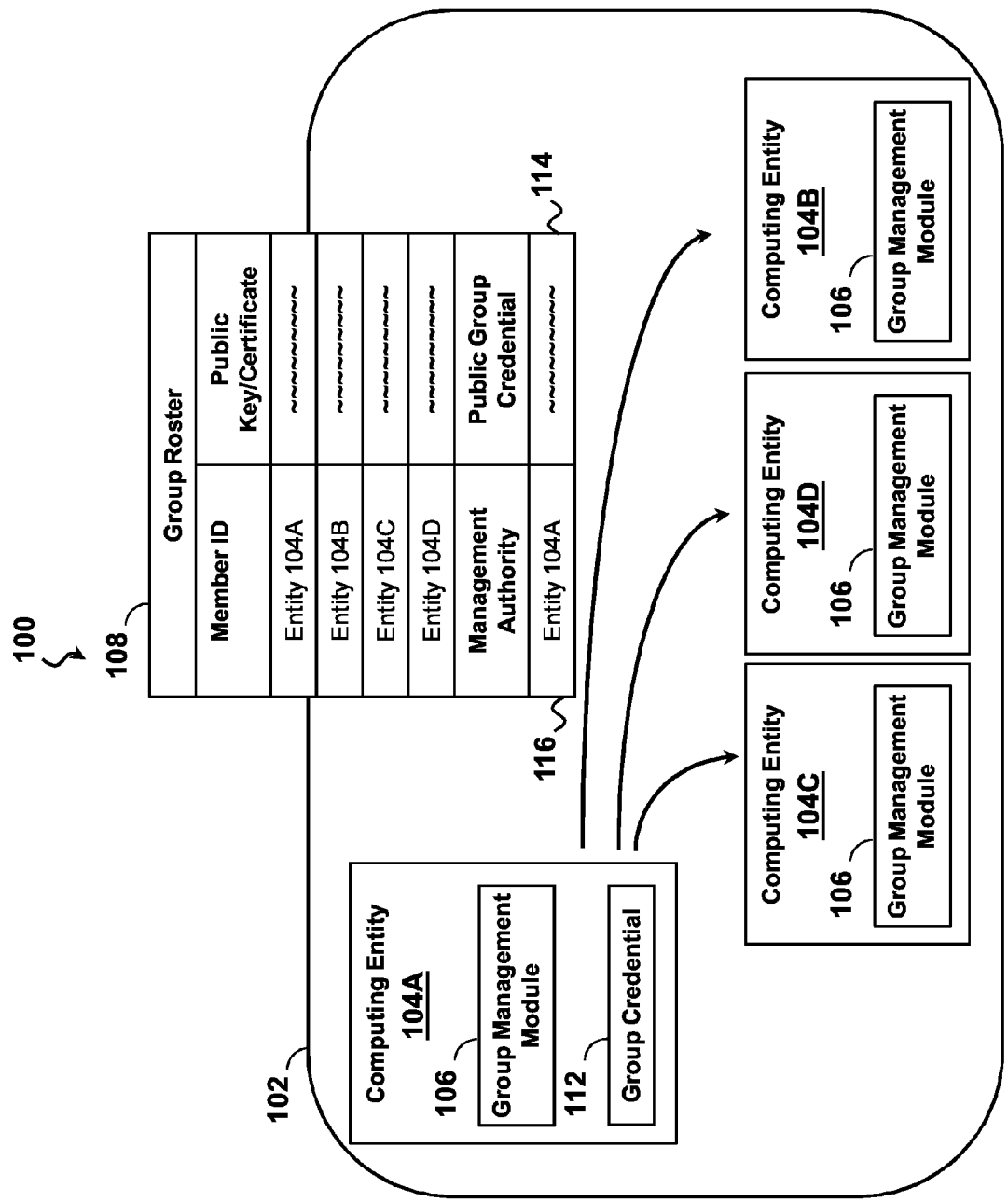

FIGS. 1A and 1B are system diagrams of a communications infrastructure 100 containing a group 102 of computing entities according to aspects of the present disclosure. Referring first to FIG. 1A, infrastructure 100 includes computing entities 104A, 104B, 104C, and 104D. A computing entity may be any computing resource, such as a computer processing resource (e.g., a CPU, a GPU, an ASIC, an FPGA, a DSP, etc.), a communications resource (e.g., a wired or wireless communications resource), a storage resource (e.g., volatile and/or non-volatile storage resources), and/or other computing resources and may take the form of a rack-mounted device, a blade-based device, a desktop computing device, a personal computing device, a laptop, a personal digital assistant, a tablet computer, a mobile phone, and/or another suitable computing form factor. Another example of an entity is a system or cluster of processing systems and/or computing resources. Each entity may, in itself, contain a grouping of other entities. A computing entity may include a virtualized computing resource corresponding to one or more physical computing resources. Virtualized resources may be used to abstract underlying physical resources by presenting a common interface across disparate physical hardware. In other words, applications can pass instructions to the virtualized resource without regard for the corresponding physical hardware. This may greatly simplify application development. Additionally or in the alternative, an entity may include a user account operating on a computing resource. In some embodiments, the user account establishes privileges assigned to the user on one or more of the computing resource and other entities of the infrastructure 100.

Referring to FIG. 1A, entities 104A, 104C, and 104D are members of group 102. Group members may have a set of rules governing the interactions of the members. For example, in some embodiments, group member entities communicate via secured exchanges. In some such embodiments, communications between entity 104A and entity 104C are secured via a shared key encryption protocol. Shared key protocols rely on communicating parties (i.e., group member entities) possessing a common key. The key may be used as part of an encryption scheme used to secure group communications.

Communication between entities may also be secured via public/private keysets. In such embodiments, individual private keys are paired with corresponding public keys. Messages encrypted using the public key can only be decoded using the corresponding private key and vice versa. Each of entities 104A, 104B, 104C, and 104D creates at least one public and private keyset. The entity holds the respective private key and publishes the public key for other entities to use. Thus, a sender can encrypt messages using the recipient's public key that only the recipient can decrypt using the recipient's private key. A sender can also provide a verification mechanism by encrypting a message using the senders's private key. If the message can be successfully decrypted using the sender's public key, the message is authentic. In various other embodiments, communications between entities are secured through the use of certificates and/or other suitable cryptographic techniques.

Through the use of these various cryptographic protocols, communications between entity 104A and entity 104C can be secured against entities outside the group 102 and, in some embodiments, can be secured against entities within the group 102 that are not the communicating parties (e.g., entity 104D). Of course, one of skill in the art will recognize that these are merely examples of encryption schemes suitable for use in a communication infrastructure 100. The concepts of the present disclosure apply equally to these further protocols.

To track the group information, member information, and/or cryptographic information, each entity 104A, 104B, 104C, and 104D includes a group management module 106 that manages groups and credentials associated with the respective entity. The group management module 106 may also have the capability to perform group administration tasks including adding and removing entities from groups (e.g., group 102). In one example, a request is sent to add entity 104B to the group 102. Such a request may be referred to as a "join request." In some embodiments, the request is provided by the entity to be added, entity 104B. In some embodiments, the request is provided by a member entity, such as a super-administrator entity (not shown) or an existing member of the group 102 (e.g., entity 104A, 104C, or 104D). In some embodiments, the join request is provided by a user of an entity. One or more of the group members may review the request, and, if entity 104B meets membership criteria, the reviewing member(s) may update the group 102. To prevent multiple member entities from attempting to add entity 104B and to prevent situations where none of the member entities reviews the request, one or more of entities 104A, 104C, and 104D may be designated as a group management authority. The group management module 106 of the group management authority (e.g., entity 104A) grants entity 104B membership to the group according to the protocols of the infrastructure 100. In one exemplary embodiment, the managing entity 104A adds entity 104B's identification to a group roster, thus granting entity 104B membership to the group. In embodiments in which a public key cryptographic protocol is used, the managing entity 104A may also add entity 104B's public key to the group roster.

Referring now to FIG. 1B, when entity 104B has been admitted into group 102, the group management module 106 of the managing entity 104A distributes an updated group roster 108 to the member entities. In some embodiments, the group roster 108 contains only a list of member identifiers, although the group roster 108 may also include any other suitable information including cryptographic information. For example, in embodiments utilizing a cryptographic protocol with shared public keys, the updated group roster 108 may include the public keys of the member entities 104A, 104B, 104C, and 104D. Equipped with the public keys, entity 104B can then securely communicate with the other entities 104A, 104C, and 104D within group 102. Similarly, once provided with the public key for entity 104B, entities 104A, 104C, and 104D can securely communicate with entity 104B.

The group roster 108 may also include a public group credential 114 such as a public key or certificate. In the exemplary cryptographic protocol, the public keys of the group roster 108 are distributed by a trusted party to prevent other entities from posing as group members. For example, an interloper trying to read encrypted messages transmitted between entities 104A, 104B, 104C, and 104D within group 102 may attempt to add a "false" public cryptographic key to the group roster 108, claiming that the "false" key is generated by a legitimate entity 104A, 104B, 104C, or 104D. If successful, this would allow the interfering party to pose as a legitimate member. To avoid this, in many embodiments, each legitimate entity 104A, 104B, 104C, and 104D verifies that the public cryptographic keys are provided by a trusted source. Accordingly, in some embodiments, the managing entity 104A creates and maintains a private group credential 112 and a public group credential 114. The managing entity 104A retains the private group credential 112 while the public credential 114 is provided to the members of the group 102, often in the group roster 108. The group roster 108 may also contain an ostensible claim of group management authority 116. The group roster 108 may be signed using the private group credential 114. This signature allows group members to verify that the group roster 108 was provided by a holder of the private group credential 112 and that the holder of the private group credential 112 is the ostensible managing entity.

U.S. patent application Ser. No. 13/247,333, filed on Sep. 29, 2011 and entitled "Group Management of Authenticated Entities," and U.S. patent application Ser. No. 13/096,747, filed on Apr. 29, 2011 and entitled "Scalable Groups of Authenticated Entities," disclose operation of the infrastructure 100 in more detail and each is hereby incorporated by reference in its entirety.

Figure 2:
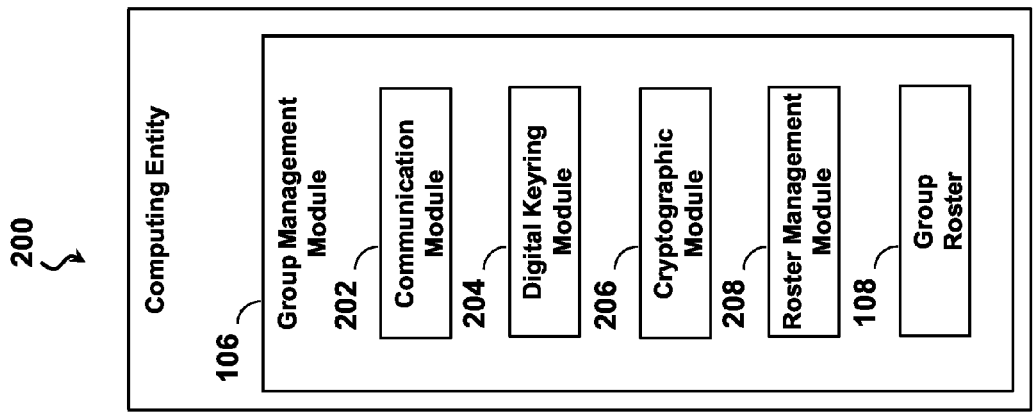
FIG. 2 is a block diagram of a computing entity including a group management module according to aspects of the present disclosure.

FIG. 2 is a block diagram of a computing entity 200 including a group management module 106 according to aspects of the present disclosure. The computing entity 200 may be substantially similar to entities 104A, 104B, 104C, and 104D of FIGS. 1A and 1B. In that regard, it should be appreciated that the computing entity 200 may be deployed in the form of, for example, a rack-mounted device, a blade device, a desktop computing device, a personal computing device, a laptop, a personal digital assistant, a tablet computer, a mobile phone, and/or other suitable computing system or hardware. In various embodiments, the computing entity 200 may be used to implement computer programs, logic, applications, methods, processes, or software to manage groups of entities, as described in more detail below.

As illustrated in FIG. 2, the computing entity 200 includes a group management module 106. In various embodiments, the group management module 106 includes a communication module 202, a digital keyring module 204, a cryptographic module 206, and/or a roster management module 208. The communication module 202 is configured to transmit and receive messages or other data to and from other computing entities. In an exemplary embodiment, the communication module 202 sends and receives request messages from other entities and provides received messages to other elements of the computing entity 200.

The digital keyring module 204 manages cryptographic credentials and in that regard may generate, create, and/or access individual and group credentials including keys, digital certificates, and other cryptographic tokens. As disclosed above, a digital certificate is an electronic credential that binds the identity of a certificate owner to a pair (public and private) of cryptographic keys that can be used to encrypt and sign information digitally. The electronic credential assures that the cryptographic keys actually belong to the specified entity. Each digital certificate may include information such as an owner's public key, owner's name or alias, expiration date of the certificate, serial number of the certificate, name of the organization that issued the certificate, digital signature of the organization that issued the certificate, and other information. One of skill in the art will recognize other suitable cryptographic methods for securing transmissions and verifying entities. Accordingly, in some embodiments, the digital keyring module 204 manages other types of cryptographic tokens.

The cryptographic module 206 is configured to apply the credentials of the digital keyring module 204 to encrypt and decrypt messages received from or transmitted to other entities. Thus, in various embodiments, cryptographic module 206 performs encryption and decryption using digital certificates and other cryptographic keys generated or provided by the digital keyring module 204.

The roster management module 208 accesses and manages a group roster 108 substantially similar to the group roster of FIGS. 1A and 1B. The group roster 108 includes a list of entities that have been admitted into a particular group, entity-specific cryptographic information, group-specific cryptographic information, group management authorities, and/or other relevant data. This group roster 108 may be embodied in a variety of different data structures, such as database tables, arrays, linked lists, and other data structures. The group management module 106 may reference the group roster 108 to identify the entities that belong to a particular group and may use cryptographic information within the group roster 108 to communicate securely with other group members. It should be noted that in other embodiments, the group management module 106 may include fewer or more modules apart from those shown in FIG. 2.

The modules 202, 204, 206, and 208 may each take the form of an entirely hardware embodiment, an entirely software embodiment, or an embodiment containing both hardware and software elements. Furthermore, the modules may take the form of a computer program product accessible from a tangible computer-usable or computer-readable medium providing program code for use by or in connection with a computer or any instruction-execution system. For the purposes of this description, a tangible computer-usable or computer-readable medium can be any apparatus that can store the program for use by or in connection with the instruction execution system, apparatus, or device. In various embodiments, the medium may include any appropriate storage medium such as a hard drive medium, sold-state drive medium, optical storage, other ROM, flash memory, PROM, EPROM, RAM, and/or other suitable storage medium.

Figure 3:
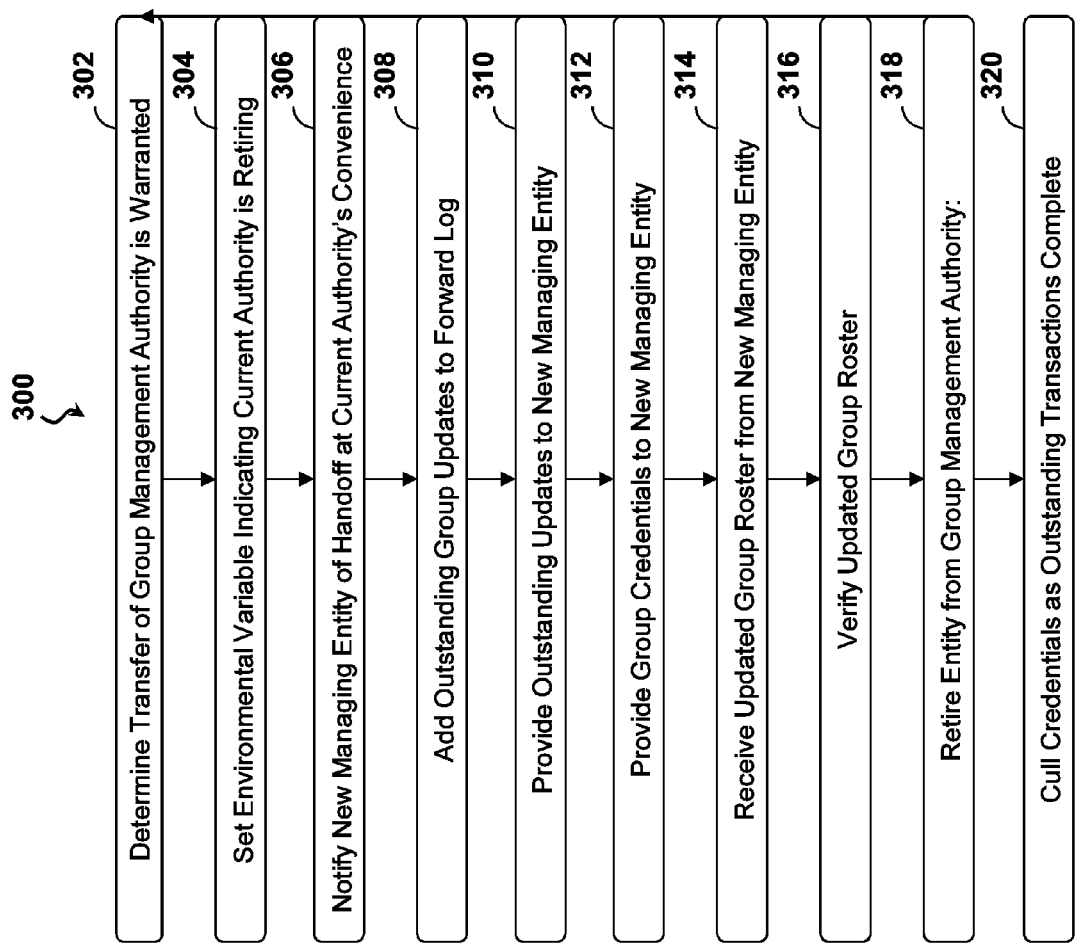
FIG. 3 is a block diagram of a method of designating group management authority according to aspects of the present disclosure.

A method 300 of designating and, more specifically, transferring group management authority is disclosed with reference to FIGS. 3-9. FIG. 3 is a block diagram of the method 300 of designating group management authority according to aspects of the present disclosure. It is understood that additional steps can be provided before, during, and after the method 300, and some of the steps described can be replaced or eliminated for other embodiments of the method 300. The method 300 is suitable for performing by a computing entity (e.g., entity 104A, 104B, 104C, and/or 104D of FIGS. 1A and 1B, and/or entity 200 of FIG. 2). FIGS. 4-9 are diagrams of a communications infrastructure 400 performing the method of designating group management authority according to aspects of the present disclosure.

Figure 4:
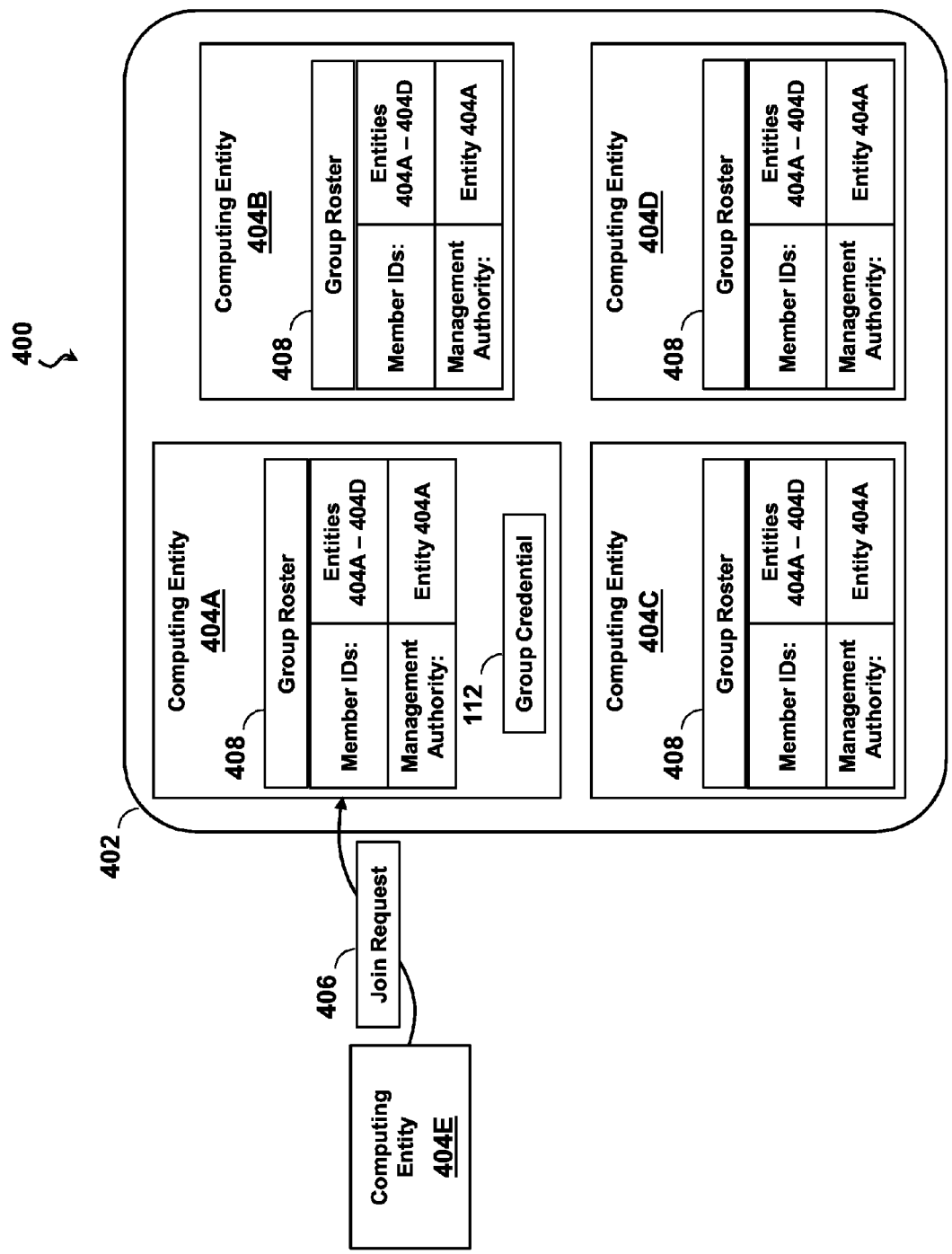
FIGS. 4-9 are diagrams of a communications infrastructure performing a method of designating group management authority according to aspects of the present disclosure.

Referring first to FIG. 4, the infrastructure 400 includes multiple computing entities 404A, 404B, 404C, 404D, and 404E, each of which may be substantially similar to computing entities 104A, 104B, 104C, and 104D of FIGS. 1A and 1B and computing entity 200 of FIG. 2. In the illustrated embodiment, computing entity 404A possesses group management authority for group 402 of which, entities 404A, 404B, 404C, and 404D are members. Managing entity 404A maintains a group roster 408 substantially similar to the group roster 108 disclosed with reference to FIGS. 1A, 1B, and 2. In that regard, the group roster 408 may include the authenticated digital certificates of one, more, or all entities included within a group, entity identifiers, a group identifier, a group digital certificate, and/or a managing entity identifier.

To add a member to group 402, the managing entity (e.g., entity 404A) receives a join request 406. In the illustrated embodiment, the join request 406 is provided by the entity to be added (e.g., entity 404E). In further embodiments, the join request 406 is provided by a group member, such as a super-administrator entity (not shown) or a non-managing entity that is a member of the group 402 (e.g., entity 404B, 404C, or 404D). In further embodiments, the join request 406 is provided by a user of the managing entity 404A. In response to the join request 406, the managing entity 404A updates a group roster 408 to include an identifier of the joining computing entity 404E such as a user name, an organization name, Media Access Control (MAC) address, processor serial number, and/or other identifier and may also update the roster 408 to include any suitable cryptographic information for the joining entity 404E such as a public key or a public certificate. In an embodiment, the managing entity 404 signs a digital certificate of the joining entity 404E with a private group credential 112 and adds the resulting authenticated digital certificate to the group roster 408.

Figure 5:
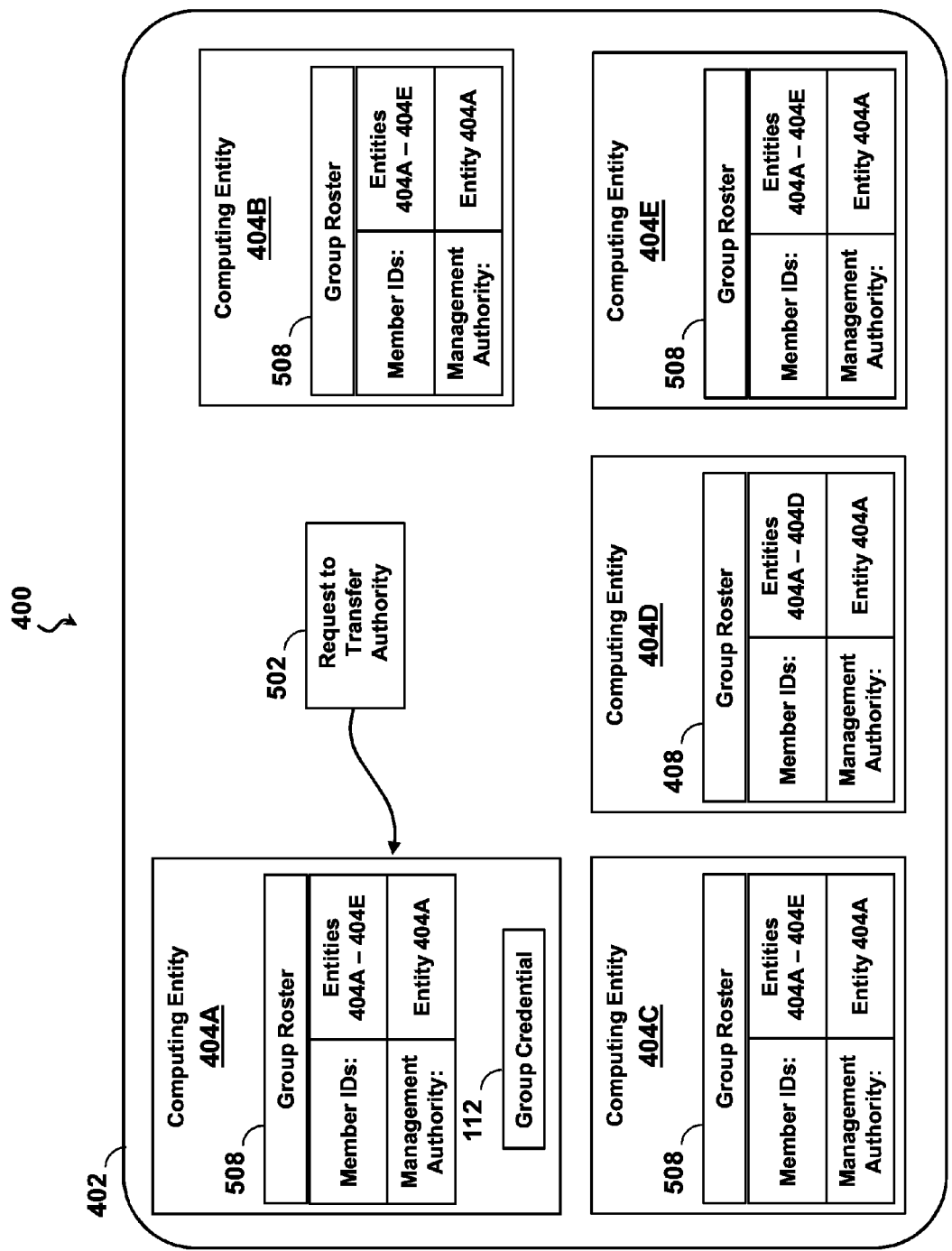

Referring to FIG. 5, the managing entity 404A distributes the updated group roster (now group roster 508) to the entities of the group (e.g., entities 404B, 404C, 404D, and 404E) to update the group members with the new group structure. However, in the illustrated embodiment, entity 404D is not in communication with the group 402 and does not receive the group roster 508 because of a minor operating fault. Entity 404D is only aware of the previous group roster 408.

Referring to block 302 of FIG. 3 and referring still to FIG. 5, a managing entity determines that a transfer of group management authority is warranted. In the illustrated embodiment, entity 404A determines that group management authority is to be transferred from entity 404A to entity 404B. The determination may be based on a request provided by another entity, a request provided by a user of the managing entity, by an internal condition of the managing entity, and/or by other suitable factors. Accordingly in some embodiments, a request 502 to transfer group management authority is provided to entity 404A by the new management authority, entity 404B, a super-administrator entity (not shown), and/or a non-managing entity that is a member of the group 402 (e.g., entity 404C or 404D). In an embodiment, a request 502 is provided by a network watchdog in response to a network impairment that affects entity 404A. In some embodiments, a request 502 to transfer group management authority is provided to entity 404A by a user and/or an administrator of entity 404A. In further embodiments, entity 404A determines that a transfer of group management authority is warranted based on system maintenance scheduled for entity 404A and/or a shutdown instruction underway on entity 404A.

Figure 6:
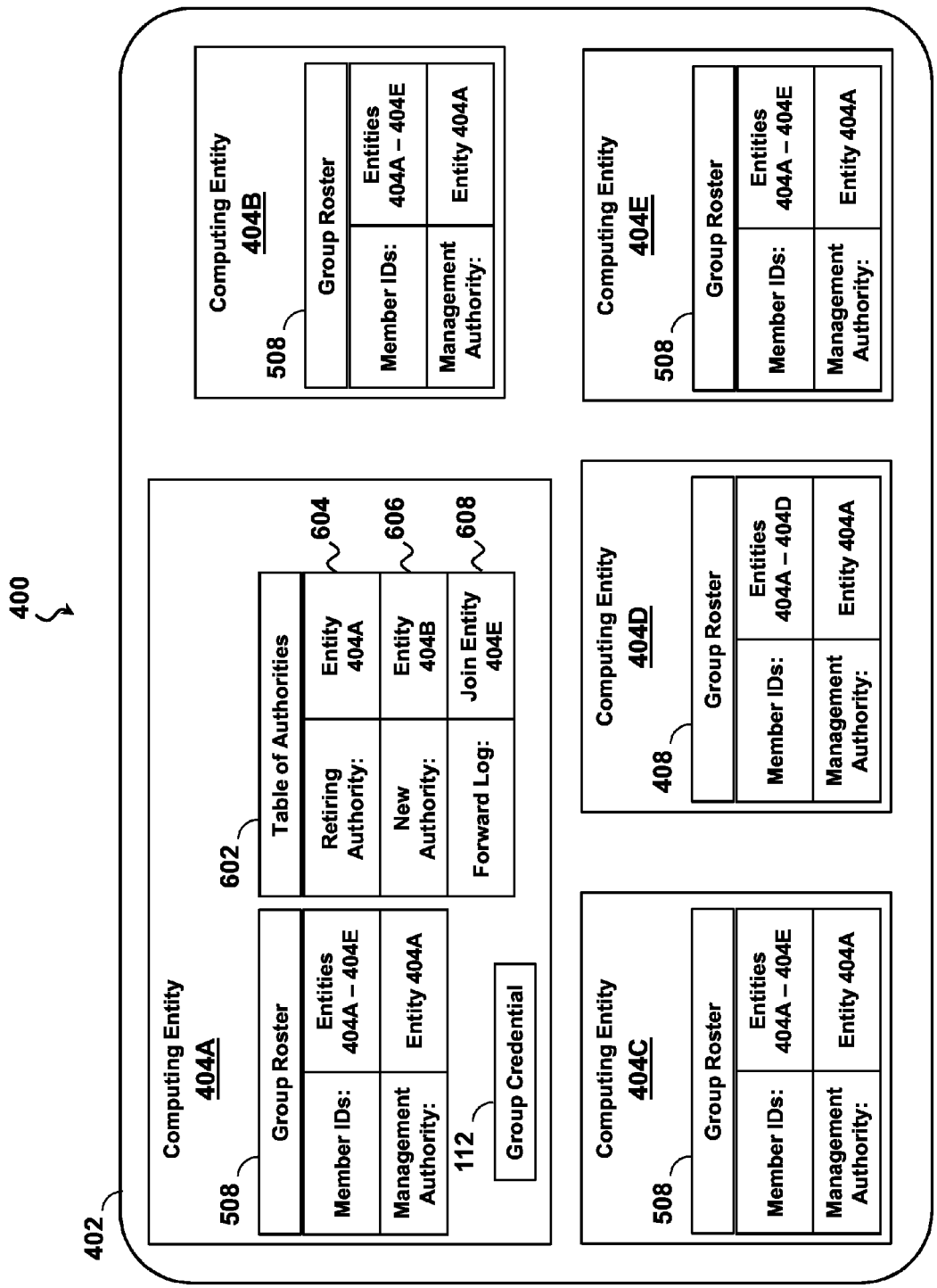

Referring to block 304 of FIG. 3 and referring to FIG. 6, the managing entity 404A sets an environmental variable of the managing entity 404A that indicates that the entity 404A is retiring. In some embodiments, the managing entity 404A maintains table of authorities 602. The authority table 602 may be embodied in a variety of different data structures, such as database tables, arrays, linked lists, and other data structures. The managing entity 404A may update a "retiring_master" or "retiring_authority" entry 604 in the authority table 602 to indicate that entity 404A is retiring and may also update an entry in the table 602 indicating the next managing entity such as a "new_master" or "new_authority" entry 606 of FIG. 6.

Referring to block 306 of FIG. 3, the retiring managing entity 404A notifies the new managing entity (e.g., entity 404B) that authority is being handed off to the new managing entity 404B. This notification may grant the new managing entity 404B both the authority and the responsibility to perform updates to the group consistent with the group authority role. The notification may also task the new managing entity 404 with updating the member entities as described in more detail below. There is no timeliness requirement and the retiring managing entity 404A may notify the new managing entity 404B opportunistically at the retiring entity 404A's convenience.

The managing entity 404A may begin the transfer of authority at a time when updates to the group are still pending. In the illustrated embodiment, the managing entity 404A has an outstanding request to add entity 404E to the group 402. Requests may be outstanding for a number of reasons. The managing entity 404A may be awaiting a response used to authenticate a requested change to the group roster 508. Alternately, the managing entity 404A may have provided an updated group roster 508 to some of the group member entities but not others. In the embodiment of FIG. 5, entity 404D has lost communication with the group 402 and has not yet received group roster 508 indicating that entity 404E has joined the group 402. Thus, the transaction or update is outstanding. In block 308 of FIG. 3, the managing entity 404A adds outstanding group updates, such as updates to the group roster 508, to an intentions list or forward log 608 that may be included as an entry in the authority table 602.

Because the member entities may not be aware that master entity 404A is retiring, entity 404A may continue to receive join requests and other group update requests. The retiring master may cancel new requests with an instruction to retry later or may forward the request to the new managing entity 404B. Forwarded requests may be added to the forward log 608.

Figure 7:
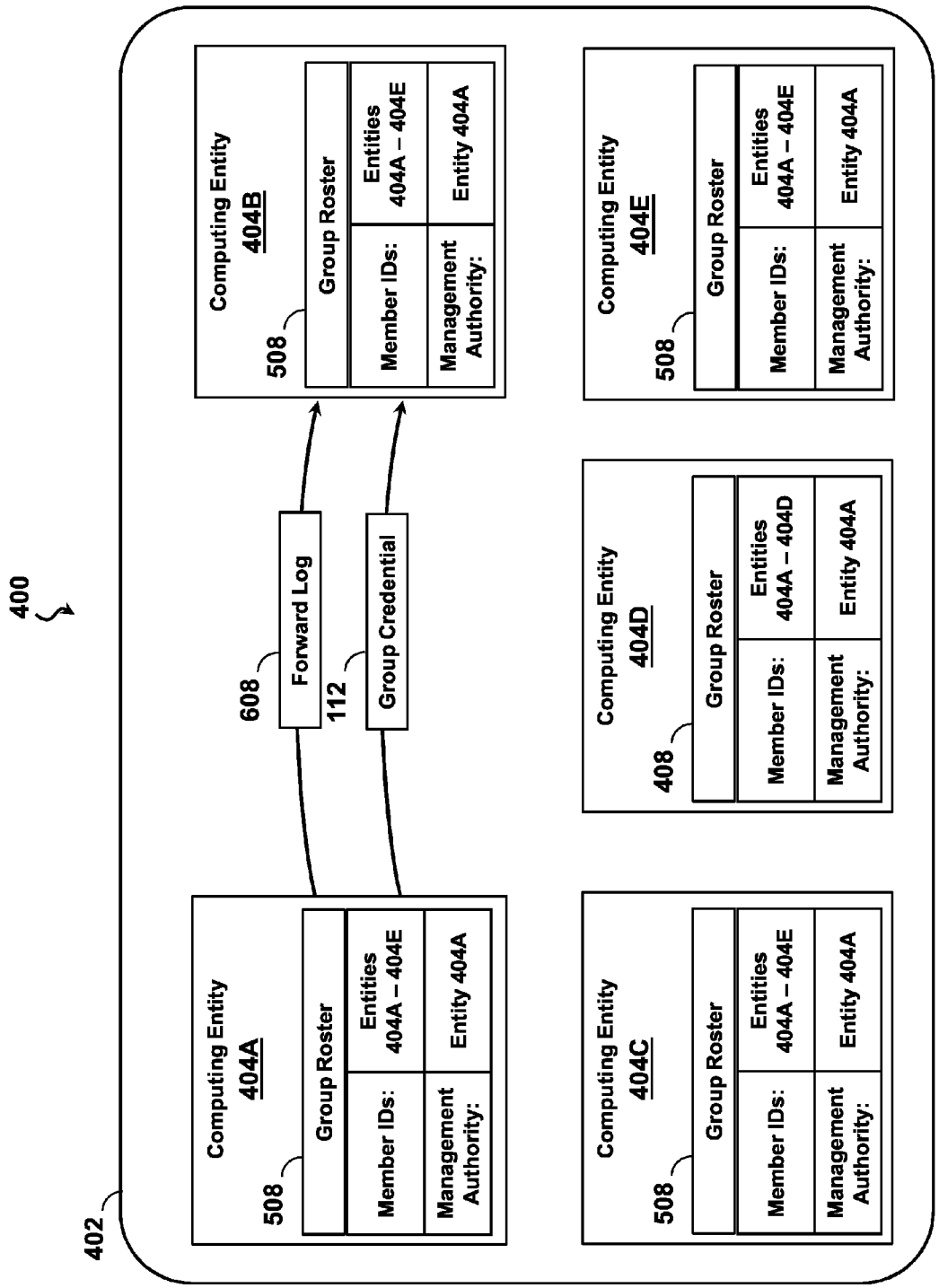

Referring to block 310 of FIG. 3 and referring to FIG. 7, the retiring managing entity 404A provides the outstanding updates of the forward log 608 to entity 404B. This may include forwarding the associated requests themselves, providing a copy of the forward log 608 and/or providing a copy of incomplete work such as an incompletely distributed group roster 508. In some embodiments, this forward log 608 serves as the notice of block 306. Thus, from the standpoint of entity 404B, this action may be the start of the transfer of the authority to entity 404B. Receipt of the forward log 608 may task new managing entity 404B with the responsibility of completing the outstanding updates. Accordingly, once a master entity 404A has indicated it is retiring in block 306, the entity need not service any further request other than, in some embodiments, to forward them to the new managing entity 404B and need not provide group roster 508 updates to any group member other than the new managing entity 404B. This allows the retiring entity 404A to transfer managing authority without waiting for the outstanding updates to complete. This greatly streamlines authority handoff especially in environments where entities (e.g., entity 404E) regularly lose communication with the group 402. This makes the handoff procedure of method 300 particularly well suited to networks with limited oversight and intermittent failure such as the Internet. As a further advantage, the retiring entity 404A can provide the outstanding requests to the new managing entity opportunistically as opposed to subject to a time constraint. This allows the managing entity 404A to retire at its convenience.

Referring to block 312 of FIG. 3 and referring still to FIG. 7, in some embodiments, the retiring managing entity 404A provides a group management credential to the new managing entity 404B. It is understood that whether a group management credential is provided and the type of credential provided depends on the cryptographic scheme utilized by the infrastructure 400. As merely an example, in an embodiment, the retiring managing entity 404A provides a digital document identifying the new managing entity 404B and signed by the retiring entity 404A. In another exemplary embodiment, the retiring managing entity 404A provides the new managing entity 404B with the group private credential 112. In another exemplary embodiment, the retiring entity 404A authorizes the new managing entity 404B to generate a new group private credential 112 rather than risk transmitting the existing credential 112. In yet another exemplary embodiment, the retiring managing entity 404A provides the new managing entity 404B with an authenticated certificate authorizing 404B's claim to authority. The managing entity 404A may provide any group management credential concurrently with providing the outstanding requests of the forward log 608 as disclosed in block 310. In that regard, the managing entity 404A may provide a group management credential to the new managing entity 404B opportunistically at entity 404A's convenience.

Figure 8:
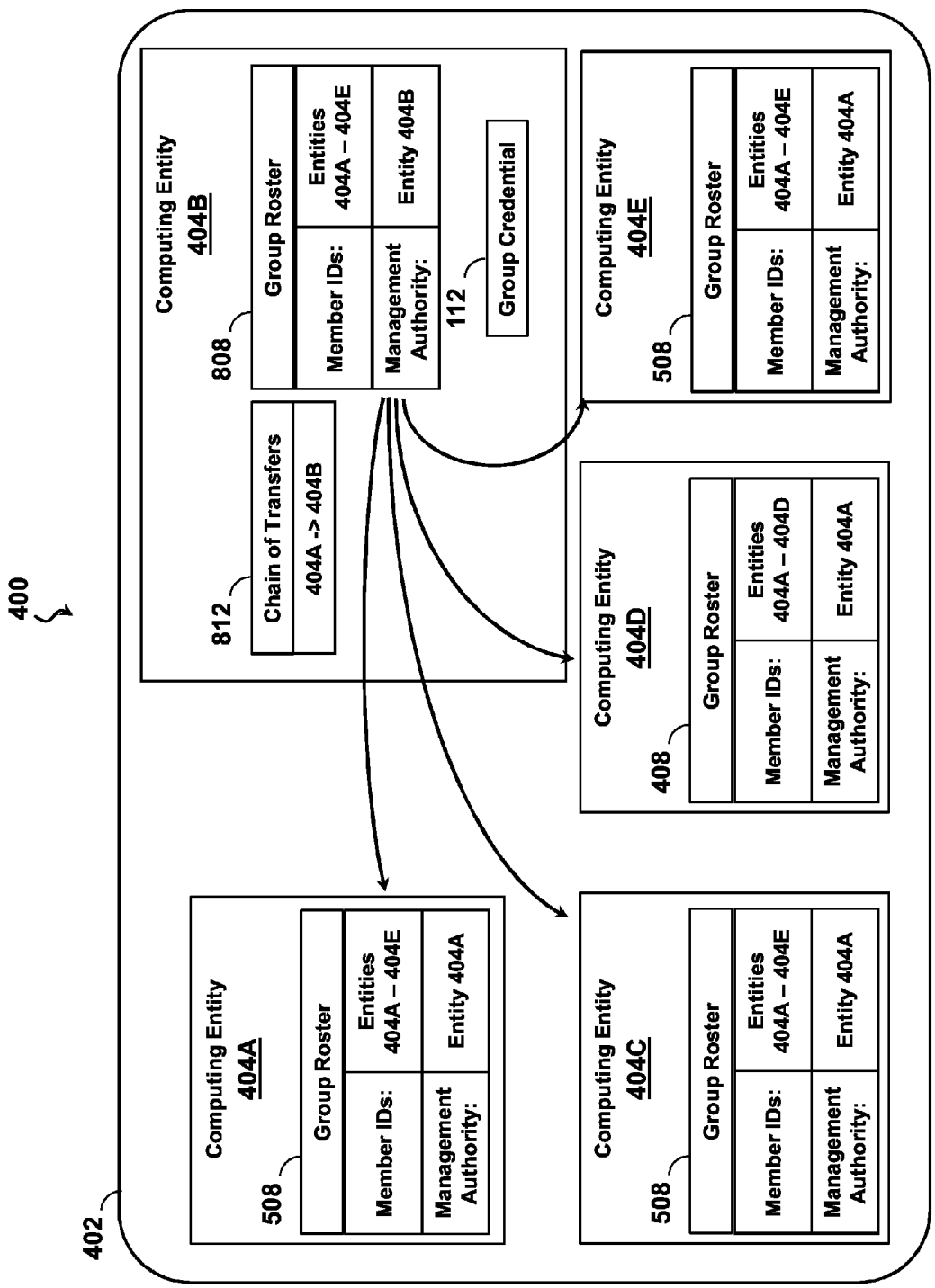

Referring to FIG. 8, entity 404B creates an updated group roster 808 indicating the handoff of group management authority from entity 404A to entity 404B. In block 314 of FIG. 3, the retiring managing entity 404A receives confirmation that entity 404B has assumed group management authority. In some embodiments, the confirmation includes or accompanies an updated group roster 808. Entity 404B may further provide the updated group roster 808 indicating the handoff to the other group members including entities 404C, 404D, and 404E. Referring to block 316 of FIG. 3, the receiving entities, including entity 404A, verify 404B's claim of management authority based on an accompanying credential. In some embodiments, the credential includes a group public credential. In some embodiments, the credential includes a group certificate signed by the retiring managing entity 404A. In an embodiment, the credential includes a chain of transfers 812 verifying that entity 404A assumed the management authority from a legitimate party. The chain of transfers 812 may include identities of the transferring parties and may include an authorized certificate signed by the respective retiring managing entities. Further embodiments utilize other suitable verifications methods and such embodiments are both contemplated and provided for.

Until retiring managing entity 404A receives and verifies the updated group roster 808, entity 404A may continue to provide outstanding requests to entity 404B as disclosed in block 310. Once entity 404A receives the updated group roster 808, entity 404A can retire and may refuse any further management function.

Figure 9:
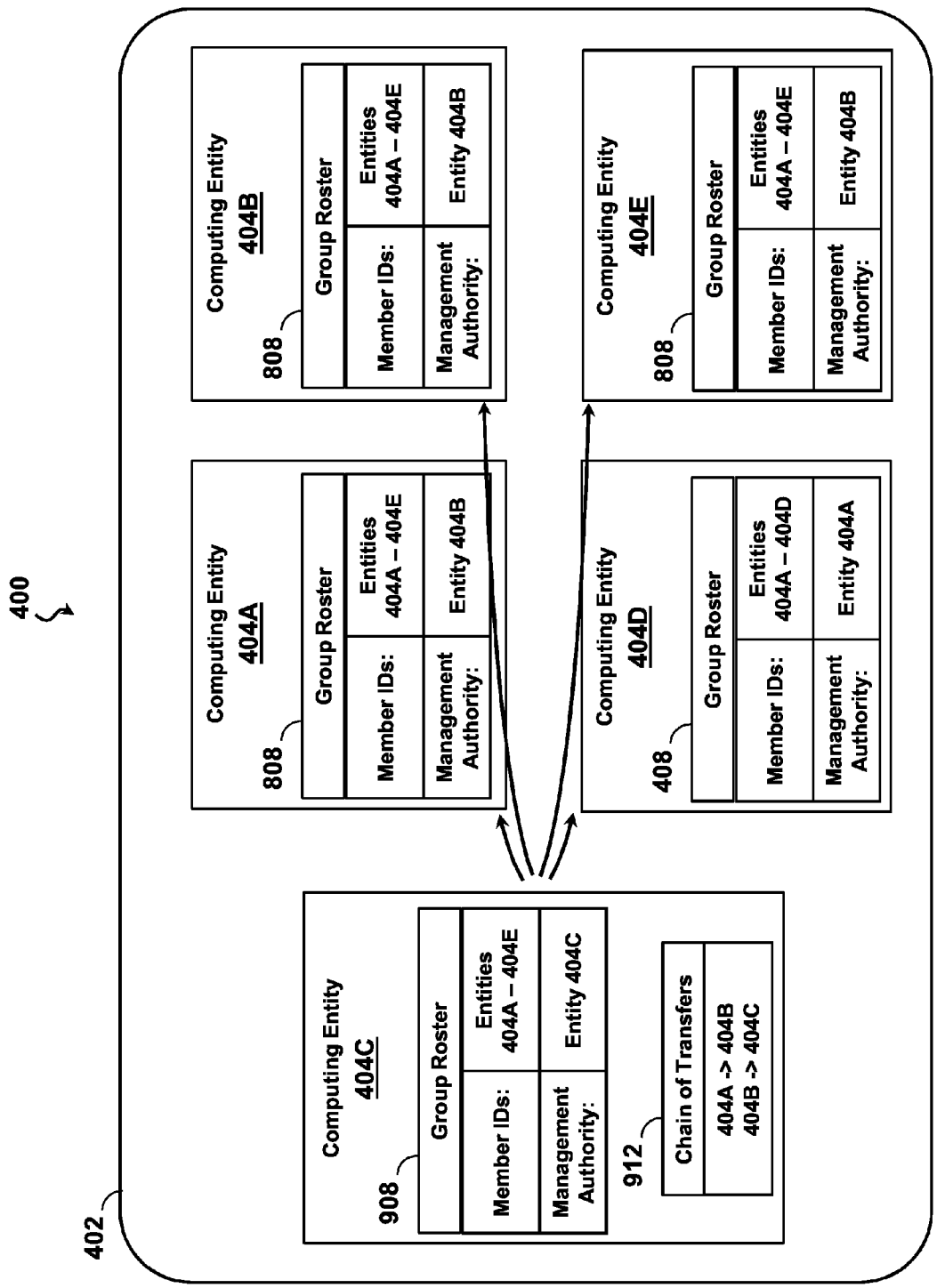

In an exemplary embodiment, the updated group roster 808 is not received by entity 404D, which has lost communication with the group 402. However, as disclosed above, this does not impede the handoff from entity 404A to entity 404B. In fact, the handoff of blocks 302-318 may be repeated multiple times before entity 404E re-establishes communication. Referring now to FIG. 9, entity 404B transfers group management authority to entity 404C substantially as disclosed in blocks 302-318. In block 314, for example, entity 404C provides an updated group roster 908 indicating the handoff to the group members 404A, 404B, 404D, and 404E. In the illustrated embodiment, the outstanding requests from the handoff from 404A to 404B have not completed before the subsequent handoff from 404B to 404C. In such embodiments, the new managing entity 404C may provide credentials sufficient to verify all handoffs back to the last incomplete handoff. For example, in one such embodiment, the new managing entity 404C provides a group roster 908 and a chain of transfers 912 extending back to the incomplete handoff from 404A to 404B. Similar to how entity 404A did not necessarily wait until the outstanding requests were resolved to retire, entity 404B may retire before the outstanding requests complete.

In the embodiment of FIG. 9, entity 404D has re-established communication in time to receive the updated group roster 908. Entity 404D then verifies each handoff in the sequence from the last known managing entity (e.g., entity 404A) to the entity currently claiming management authority (e.g., entity 404C). The verification may depend on how entities recognize managing entities. In some embodiments, the entity 404D merely verifies that each entity in the chain is a group member and that the chain is unbroken from the last known managing entity to the entity currently claiming authority. In some embodiments, the entity 404D verifies the handoffs using cryptographic information such as public cryptographic keys and/or signed certificates verifying the transfer of authority. In one such embodiment, entity 404D verifies that the chain of transfers 912 includes a certificate signed by entity 404A authorizing the transfer of authority to entity 404B and a certificate signed by entity 404B authorizing the transfer of authority to entity 404C. When entity 404D is satisfied that the group roster 908 is provided by a legitimate authority, the entity 404D updates the old group roster 408 with the new roster 908.

Referring to block 320, the credential, such as the chain of transfers (e.g., chain of transfers 812 and/or chain of transfers 912) can be culled to remove handoffs when the associated outstanding transactions complete. This avoids building an ever-increasing list of transfers. In the illustrated embodiment, with the update of entity 404D, the outstanding transactions for the handoff from entity 404A to entity 404B have completed as well as the outstanding transactions for the handoff from entity 404B to entity 404C. These transactions are therefore removed from the chain of transfers. However, it should be noted, that in some embodiments, the culling of block 320 does not significantly reduce management burden, and in such embodiments, the chain of transfers is not culled.

Figure 10:
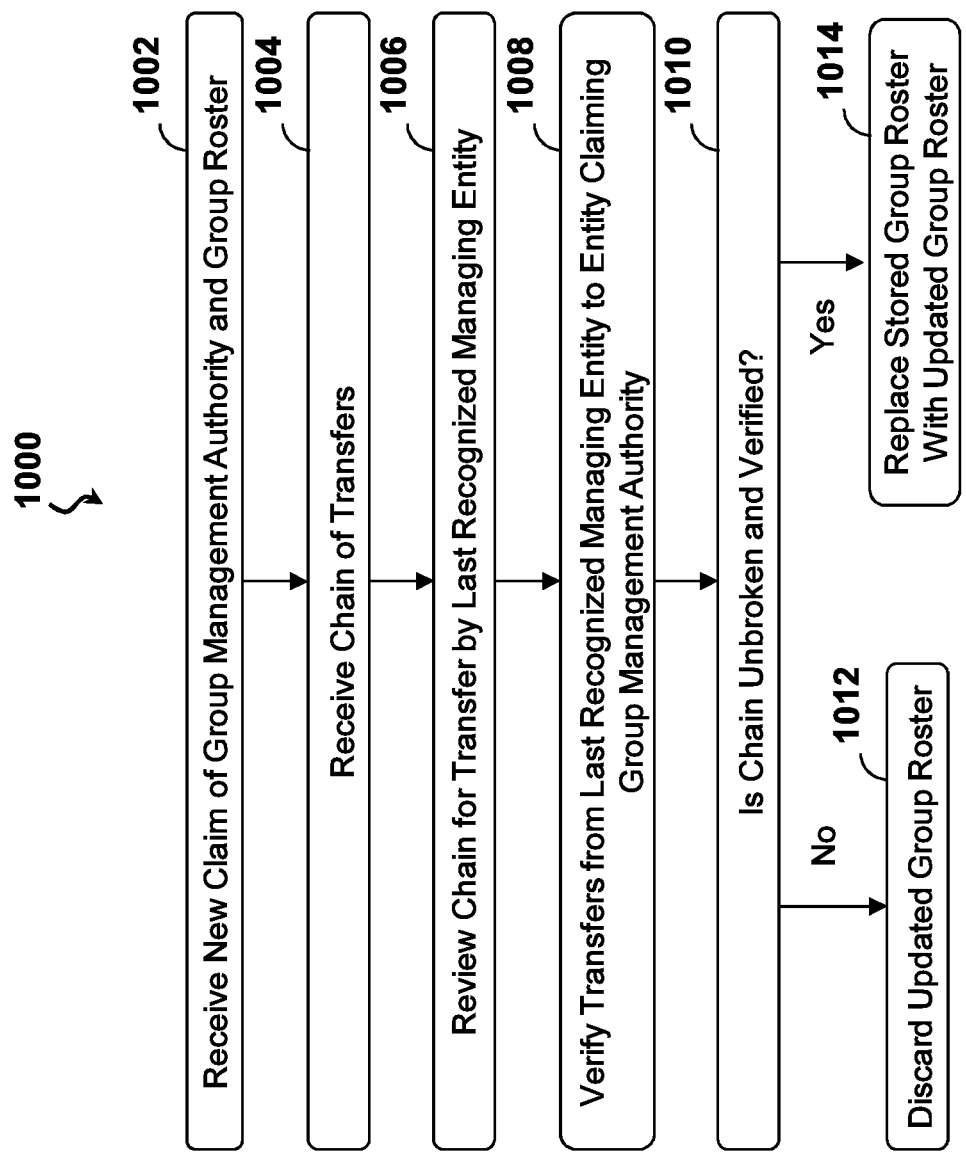
FIG. 10 is a block diagram of a method of verifying an assertion of management authority according to aspects of the present disclosure.

FIG. 10 is a block diagram of a method 1000 of verifying an assertion of management authority according to aspects of the present disclosure. It is understood that additional steps can be provided before, during, and after the method 1000, and some of the steps described can be replaced or eliminated for other embodiments of the method 1000. The method 1000 is suitable for performing by a computing entity (e.g., entity 104A, 104B, 104C, and/or 104D of FIGS. 1A and 1B, entity 200 of FIG. 2, and/or entity 404A, 404B, 404C, 404D, and/or 104E of FIGS. 4-9).

In block 1002, the entity receives a new claim of group management authority. In many embodiments, the claim of group management authority accompanies and/or is included in an updated group roster. The group roster may be substantially similar to the group roster of FIGS. 1A, 1B, and 2-9. In that regard, the group roster may include a list of entities that have been admitted into a particular group, entity-specific cryptographic information, group-specific cryptographic information, group management authorities, and/or other relevant data.

In block 1004, the entity receives a chain of transfers specifying how the new group management authority assumed the authority. The chain of transfers may be substantially similar to the chain of transfers of FIGS. 8 and 9. In that regard, the chain of transfers may include identities of the transferring parties and may include an authorized certificate signed by one or more retiring managing entities.

In block 1006, the entity searches the chain of transfers to locate the last managing entity recognized by the searching entity. In block 1008, the entity verifies each transfer in the chain of transfers from the last recognized managing entity to the entity claiming group management authority. This verification may be performed in accordance with any suitable security protocol known to one of skill in the art. In some embodiments, the entity verifies the transfers of authority using information such as public cryptographic keys and/or signed certificates. For example, in some such embodiments, the entity identifies a transfer from the last recognized managing entity to an intermediate entity. Credentials within the chain of transfers are examined to determine that this first transfer was legitimate. This may include inspecting for a valid certificate authorizing the transfer signed by the transferring entity. Examining the credentials may also include determining whether a credential is signed using a group private key and/or a private key of the transferring entity. Once the transfer from the last recognized managing entity to the intermediate entity is verified, the chain of transfers may be examined to identify a transfer from the intermediate entity to a second intermediate entity. In some exemplary embodiments, this process is repeated until the transfer to the entity claiming management authority is verified.

In block 1010, it is determined whether the chain of transfers contains an unbroken and verified record of the transfers from the last recognized managing entity to the entity claiming group management authority. If not, in block 1012, the updated group roster may be discarded. If the chain of transfers is complete, in block 1014, the entity replaces an existing group roster maintained by the entity with the updated group roster.

Thus, the present disclosure provides a system and method for designating and administering authority in a trusted environment. In some embodiments, method for transferring status within a group of computing entities is provided. The method comprises: at a first computing entity having an authority, determining that a transfer of the authority to a second computing entity is warranted; opportunistically contacting the second computing entity; and during the opportunistic contact, passing the authority from the first computing entity to the second computing entity, wherein the passing of the authority from the first computing entity to the second computing entity tasks the second computing entity with updating members of the group of the passing of the authority.

In some embodiments, a computing entity is provided. The entity comprises a group management module including: a processor; and a memory storage element, wherein the memory storage element contains instructions readable by the processor, and wherein the instructions, when executed, are operable to: determine that a transfer of an authority role from the computing entity to a new managing entity is warranted; opportunistically provide notice to the new managing entity that the computing entity is retiring from the authority role; receive a confirmation from the new managing entity; and in response to the receiving of the confirmation, retire the computing entity from the authority role.

In some embodiments, an apparatus is provided. The apparatus comprises: a non-transitory, tangible computer readable storage medium storing a computer program, wherein the computer program has instructions that when executed by a computer processor, carry out: receiving, at a computing entity, a new claim of authority; receiving, at the computing entity, a chain of transfer of authority; receiving, at the computing entity, an updated group roster; verifying the new claim of authority based on the chain of transfers; and replacing an existing group roster maintained by the computing entity with the updated group roster in response to the verifying of the new claim of authority.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method for transferring status within a group of computing entities, the method comprising:
at a first computing entity having an authority, determining that a transfer of the authority to a second computing entity is warranted;
contacting the second computing entity;
during the contact, passing the authority from the first computing entity to the second computing entity,
wherein the passing of the authority from the first computing entity to the second computing entity tasks the second computing entity with updating members of the group of the passing of the authority;
receiving, at the first computing entity, an updated group roster from the second computing entity; and
in response to the receiving of the updated group roster, retiring the first computing entity.

2. The method of claim 1 further comprising providing an outstanding group update to the second computing entity, wherein the providing of the outstanding group update tasks the second computing entity with completing the outstanding group update.

3. The method of claim 2, wherein the providing of the outstanding group update includes providing a group roster that has not been completely distributed to the members of the group.

4. The method of claim 2, wherein the providing of the outstanding group update includes forwarding a request associated with the outstanding group update.

5. The method of claim 1, wherein the passing of the authority further includes exchanging a document that identifies the second computing entity and that is cryptographically signed by the first computing entity.

6. The method of claim 5, wherein the document that identifies the second computing entity and that is cryptographically signed by the first computing entity is included in a chain of transfers.

7. The method of claim 1 further comprising verifying the updated group roster prior to the retiring the first computing entity.

8. A computing entity, the entity comprising:
a group management module including:
   a processor; and
   a memory storage element, wherein the memory storage element contains instructions readable by the processor, and wherein the instructions, when executed, are operable to:
      determine that a transfer of an authority role from the computing entity to a new managing entity is warranted;
      provide notice to the new managing entity that the computing entity is retiring from the authority role;
      receive, by the computing entity, a confirmation from the new managing entity that includes a roster identifying members of a computing group and identifying the new managing entity as having assumed the authority role; and
      in response to the receiving of the confirmation, retire the computing entity from the authority role.

9. The computing entity of claim 8, wherein the instructions, when executed, are further operable to set an environmental variable indicating that the computing entity is retiring in response to the determining.

10. The computing entity of claim 8, wherein the instructions, when executed, are further operable to provide an outstanding group update to the new managing entity.

11. The computing entity of claim 10, wherein the instructions, when executed, are further operable to forward a request associated with the outstanding group update.

12. The computing entity of claim 8, wherein the instructions, when executed, are further operable to provide a digital document acknowledging the transfer of authority signed by the computing entity.

13. The computing entity of claim 8, wherein the instructions, when executed, are further operable to securely transfer a private group credential from the computing entity to the new managing entity.

14. The computing entity of claim 8, wherein the instructions, when executed, are further operable to verify the confirmation prior to the halting of further group management activity.

15. The computing entity of claim 14, wherein the instructions, when executed, are further operable to:
   receive a chain of transfers; and
   trace the chain of transfers from a last recognized managing entity to the new managing entity.

16. A method comprising:
transferring an authority role for a computing group from a first computing entity to a second computing entity, wherein the transferring includes:
   providing, from the first computing entity to the second computing entity, notification of the authority role to be transferred;
   providing, from the first computing entity to the second computing entity, a log of changes to the computing group that are in progress;
   receiving, at the first computing entity, a list of members of the computing group that contains an indication of the second computing entity having assumed the authority role; and
   in response to the receiving of the list of members, ceasing, by the first computing entity, to respond to subsequent requests for changes to the computing group.

17. The method of claim 16, wherein the log of changes that are in progress is the provided notification of the authority role to be transferred.

18. The method of claim 16 further comprising providing a cryptographic credential associated with the authority role from the first computing entity to the second computing entity.

19. The method of claim 16 further comprising forwarding a request for a change to the computing group from the first computing entity to the second computing entity, wherein the request is received after the providing of the log of changes and prior to the receiving of the list of members.

20. The method of claim 16 further comprising providing, by the first computing entity, a retry instruction in response to a request for a change to the computing group, wherein the request is received after the providing of the log of changes and prior to the receiving of the list of members.

* * * * *